A. E. McCURDY.
AUTOMOBILE SIGNAL.
APPLICATION FILED JUNE 6, 1918.
1,336,644.
Patented Apr. 13, 1920.
2 SHEETS—SHEET 1.
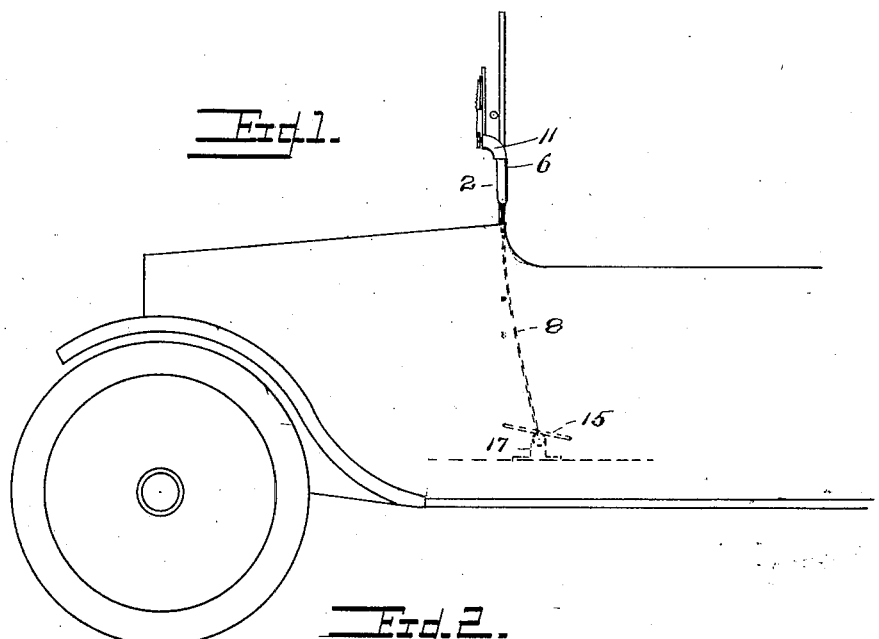
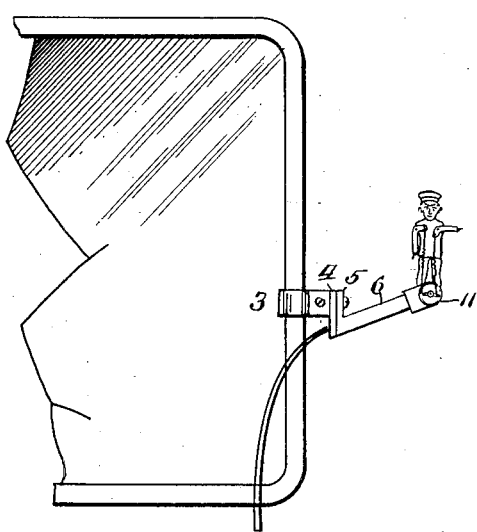
Inventor
Arville E. McCurdy
By J. M. Fowler Jr.
Attorney A. E. McCURDY.
AUTOMOBILE SIGNAL.
APPLICATION FILED JUNE 6, 1918.
1,336,644.
Patented Apr. 13, 1920.
2 SHEETS—SHEET 2.
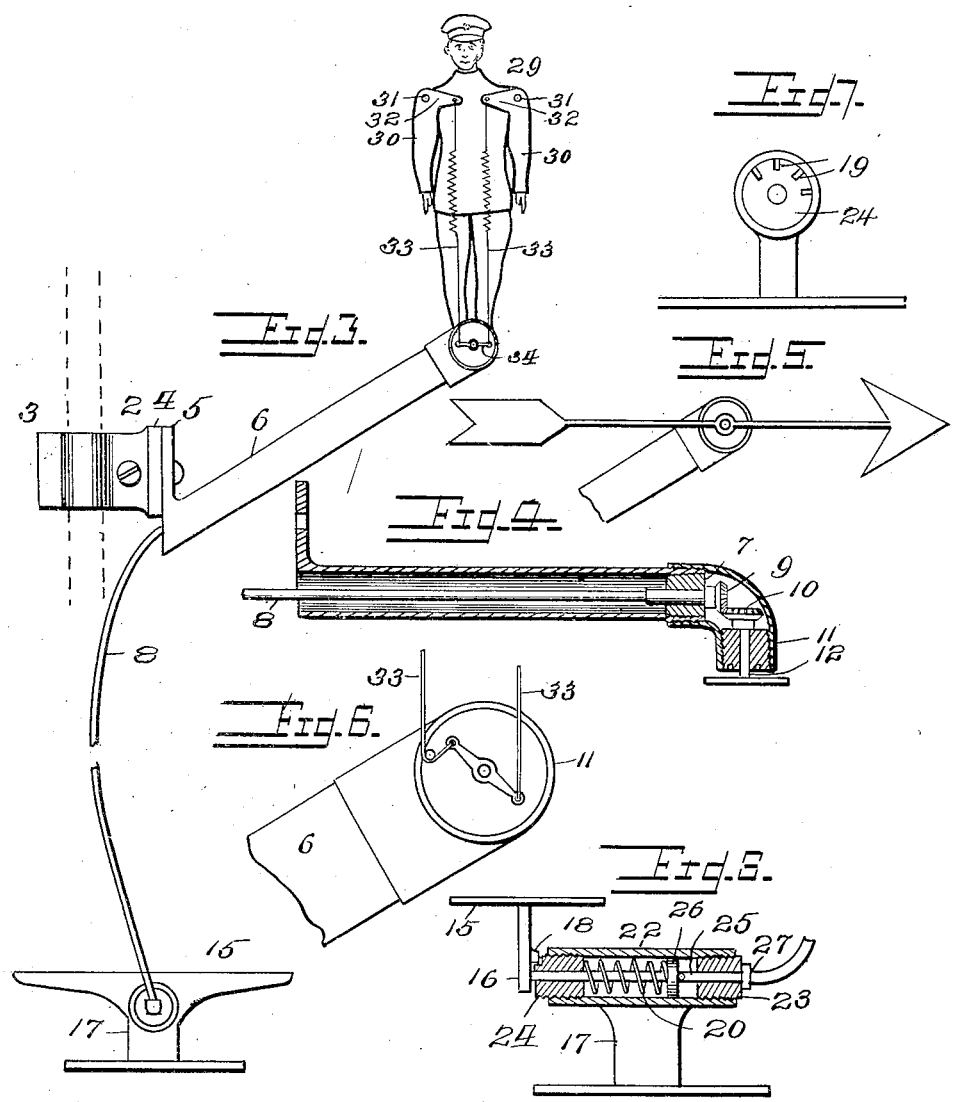
Inventor
Arville E. M<sup>c</sup>Curdy
By J. M. Fowler Jr.
Attorney

UNITED STATES PATENT OFFICE.

ARVILLE E. McCURDY, OF WASHINGTON, DISTRICT OF COLUMBIA.

AUTOMOBILE-SIGNAL.

1,336,644.          Specification of Letters Patent.      Patented Apr. 13, 1920.

Application filed June 6, 1918. Serial No. 238,587.

*To all whom it may concern:*

Be it known that I, ARVILLE E. McCURDY, a citizen of the United States, residing at Washington, in the District of Columbia, have invented certain new and useful Improvements in Automobile-Signals, of which the following is a specification.

My invention relates to improvements in automobile signals, for indicating the direction in which the machine will travel or turn, and the main object of my invention is the provision of a signal of this character which will occupy a small amount of space, which will not disfigure or mar the appearance of the automobile and which will be operated entirely by the foot enabling the driver to use his hands in the steering or other operations necessary.

Another object of my invention is the provision of a signal of the character and for the purpose stated which will be of extremely simple, strong and durable construction, which can be easily applied to the machine at a very small cost, which can be adjusted to the proper and most desirable position upon the machine, and which in all respects will prove efficient and practical.

To attain the desired objects the invention consists of a direction indicator or signal embodying novel features of construction and combination of parts, substantially as shown, described and particularly defined and distinguished by the claims.

In order that the details of construction and the operation of my invention may be understood and its many features of merit be appreciated, I have shown in the accompanying drawings, an automobile signal constructed in accordance with and embodying my invention.

Figure 1 is a side elevation of the forward part of an automobile showing my signal or direction indicator applied thereto.

Fig. 2 is a view in front elevation on an enlarged scale of a part of the windshield frame with my invention applied.

Fig. 3 is an enlarged view in elevation of the complete signal or direction indicator.

Fig. 4 is a sectional view of the hollow arm or sleeve, the flexible operating shaft, the operating gears and the indicator shaft with indicator.

Fig. 5 is a detail view of the ordinary form of arrow indicator, which may be used if desired.

Fig. 6 is a detail view of the means for operating the preferred form of indicator in the form of a human being.

Fig. 7 is a detail view of the base and pedestal showing particularly the means for retaining the foot pedal in the desired adjustments, and Fig. 8 is a detail sectional view of the foot pedal and associated mechanisms which form one of the most important features of my invention.

Referring by numeral to the drawings in which the same numerals of reference denote the same parts in all the views:

The numeral 1 designates the frame which incloses the windshield, which is of any desired size and construction and to which my direction indicator is preferably applied by means of the stationary support 2, having the clamp 3, for engagement with the said frame.

The support is provided with the portion 4, to which is adjustably connected the inner end 5, of the inclined shaft guiding sleeve 6, which on its interior is provided with the pair of perforated walls 7, which receive and support the upper end of the flexible shaft 8, which carries at its upper end the bevel gear wheel 9, meshing with the bevel gear wheel 10, said bevel gear wheels being inclosed and protected by the elbow shaped casing 11, and having a bearing for the stud 12, which extends through the said casing and has mounted thereon the hand or indicator 13, which operates to indicate the direction which the machine will travel or turn.

From this construction it will be seen that the device is attached to the windshield frame and by means of the inclined sleeve is disposed a sufficient distance from the shield to enable the indicator to show in the various positions to which it will be moved, and also that the means for attaching the sleeve permit adjustment of the sleeve according to the angle of the windshield frame, which is a feature of importance.

The flexible shaft passes inward and downward from the bevel gear wheel 9 in close proximity to the frame and forward part of the machine being retained by a suitable guide 14, and at its lower extremity is connected to the foot pedal 15, which is pivoted centrally at 16, to a suitable base 17, and is provided with projection 18, which is adapted to engage any one of the seats 19, in the said base, the engagement being made positive by means of the spring 20, disposed in the position shown to retain the pedal in the position desired to turn the shaft and move the indicator to show the direction which the machine will travel.

From the foregoing description and drawings will be noted that the movement of the foot pedal imparts a rotary action to the flexible shaft, which through the medium of the bevel gear wheels operated by said shaft causes the indicator to be moved as desired by the movement of said foot pedal to throw the indicator to the proper position to indicate the direction in which the machine will travel.

The construction of the pedal or foot mechanism is most clearly shown in Fig. 8, and consists of a base, a pedestal 17 rising therefrom formed with the sleeve 22, having in one end the screw plug 23, and in the other end the screw plug 24, the latter plug being formed with the seats 19 which are engaged by the projection 18, and the stem 25 from the lever or foot pedal 15, has the spring 20 placed around it and bearing at one end against the plug and at its other end against the disk 26, thus allowing the tilting of the foot pedal but causing the projection 18, to enter one of the seats 19, to hold the foot pedal in the desired position to move the flexible shaft, connected at 27 to the said stem and at its upper end connected to the gear wheel for operating the indicator.

I may use a pointer or indicator if desired but the preferred construction of indicator is the figure 29, secured to the elbow and having its arms 30, pivoted at 31, and formed with inturned ends 32, to which are connected the pair of yielding connections 33, having their lower ends connected to the pair of levers 34, mounted centrally on the indicator operating shaft 25, the turning of the indicator shaft moving either of the arms to indicate the right or left direction, or moving both arms to indicate that the vehicle will stop.

The many advantages of my signal will be readily understood and the device can be easily applied and is operated entirely by the foot, enabling free use of the hands for operating the machine.

I claim:

1. An automobile signal or direction indicator, consisting in the combination with the windshield frame, of a rigid support, a clamp adjustably connected to said support, a sleeve formed with and extending outward from said plate, an elbow connected to the outer end of said sleeve, a pair of shaft mountings secured in said elbow and disposed at a right angle, an indicator shaft journaled in one of said mountings, an indicator on the outer end of said shaft, a bevel gear wheel on the inner end of said shaft, a bevel gear meshing with said first named gear, a flexible shaft connected with the latter bevel gear, and a foot mechanism for moving said flexible shaft to operate the indicator, said foot mechanism consisting of a support, a sleeve on said support, apertured plugs fitting the ends of said sleeve, a shaft mounted in said plugs and having its ends extended, means connecting the flexible shaft to one of said ends, means connecting the foot pedal to the other ends, retaining devices on the pedal and one of said plugs, and a spring in the sleeve for controlling the engagement and release of said retaining devices.

2. An automobile signal or direction indicator, consisting of an adjustable clamp, a sleeve formed integral with said clamp, an elbow connected to the outer end of said sleeve, a shaft mounted in the elbow and carrying a lever upon its outer end, a figure rising from the elbow, pivoted arms carried by said figure, connections consisting of a two arm lever on the shaft, connecting means from said arms of the lever and arms of the figure between the arms and lever for moving said arms singly or in unison, said connections consisting of a two-armed lever on the shaft connecting means between the arms of the lever and the arms of the figure, and means for operating said last-named arms through the medium of said shaft.

In testimony whereof I affix my signature.

ARVILLE E. McCURDY.